March 21, 1967  M. GREEN  3,309,922
CONSTANT MOMENT LOAD CELL

Filed Oct. 9, 1964  2 Sheets-Sheet 1

INVENTOR.
MALCOLM GREEN
BY
*Blair F. Buckles*
ATTORNEYS

March 21, 1967  M. GREEN  3,309,922
CONSTANT MOMENT LOAD CELL
Filed Oct. 9, 1964  2 Sheets-Sheet 2

INVENTOR.
MALCOLM GREEN
BY
Blair & Buckles
ATTORNEYS

United States Patent Office 3,309,922
Patented Mar. 21, 1967

3,309,922
CONSTANT MOMENT LOAD CELL
Malcolm Green, Newton, Mass., assignor to Schaevitz-
Bytrex Corporation, Waltham, Mass.
Filed Oct. 9, 1964, Ser. No. 402,827
9 Claims. (Cl. 73—141)

This invention relates to load cells, and more particularly to load cells of the constant moment type.

A constant moment load cell is a load measuring device comprising, broadly, a pair of spaced pivots, a beam resting on these pivots, and at least one strain gage attached to the beam. The load to be measured is applied to the beam in a manner to cause bowing or deflection of the beam between the pivots. The magnitude of this deflection is sensed by the strain gage to produce an electrical output signal indicative of the load magnitude.

It will be apparent that in order for the beam to bow out of its straight line configuration, there must be provision to increase the distance, measured along the beam, between the two pivot points. Several arrangements have been employed in the past to allow the beam to increase in length between the pivot points and thereby bow.

In one arrangement, the pivots are fixed, and the beam rests loosely on the pivots, so that if may slide on them to reach its bowed configuration upon the application of the load. This arrangement had the obvious disadvantage that the beam may become disoriented relative to the pivots from handling, shipping, vibration, etc.

In another arrangement, the beam is rigidly secured to the pivots but the pivots are flexible, so that upon application of the load the portion of the pivots engaging the beam may move toward or away from each other to allow bowing of the beam. While this arrangement is not so delicate as the first, it is impractical in that it is difficult to construction and maintain in a condition of adjustment, and in that offers little resistance to side forces tending to displace bodily the entire beam-pivot system and thereby impair the accuracy of the cell.

Accordingly, it is an object of the present invention to provide an improved constant moment load cell.

A further object is to provide a constant moment load cell which will overcome the above-noted disadvantages and shortcomings of the prior art load cells.

A more specific object is to provide a constant moment load cell which will not readily be knocked out of adjustment.

A further object is to provide such a constant moment load cell which will strongly resist bodily displacement due to side forces.

Another object is to provide such a constant moment load cell which may be readily and inexpensively produced.

Yet another object is to provide such a constant moment load cell which is of relatively small size.

A still further object is to proivde a load cell of the above type characterized by relatively small deflection of the load-receiving portion thereof.

Still another object is to provide a constant moment load cell which is sensitive to even very small loads and and yet is extremely sturdy and insensitive to external disturbing forces.

Other objects of the invention will in part be obvious and will in part appear hereinafter.

The invention accordingly comprises the features of construction, combination of elements, and arrangement of parts which will be amplified in the construction, hereinafter set forth, and the scope of this invention will be indicated in the claims.

For a fuller understanding of the nature and the objects of the invention, reference should be had to the following detailed description taken in connection with the accompanying drawings in which.

Figure 1:
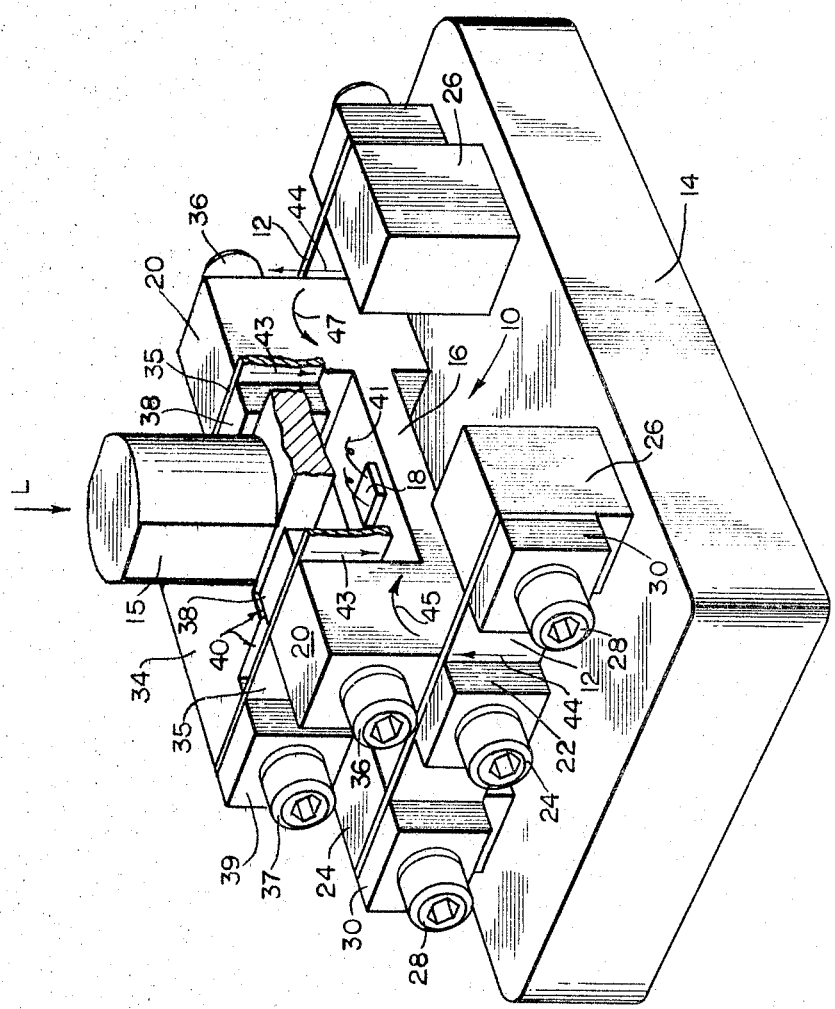
FIGURE 1 is a perspective view of a constant moment load cell according to the present invention, with a portion of the load cell broken away to reveal details of internal construction.
Figure 3:
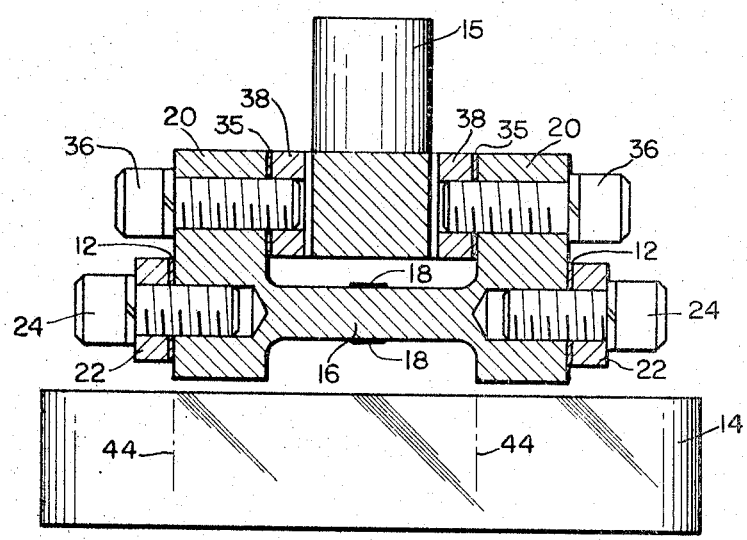
FIGURE 3 is a cross-sectional view taken on line 3—3 of FIGURE 2.

The load cell of the invention, as seen in FIGS. 1 and 3 comprises broadly a beam member 10 suspended above a base 14 by at least one, and preferably two, torsion members 12. The load L to be measured by the load cell is applied to a stud 15, which is coupled to the beam member 10 in such manner as to cause a bowing of a beam 16 in the member 10. Strain gages 18 secured to the upper and lower surfaces of the beam 16 sense the bending of the beam and in a well-known manner they convert the bending to an electrical load signal indicative of the applied load L.

In the disclosed embodiment, a torsion member 12 is provided at each end of the beam member 10, opposite the ends of the beam 16 so that upon bending of the bridge in response to the applied load, the torsion members may twist equally but in opposite directions. In some configurations this allows the ends of the beam member 10 to move inwardly toward each other and thereby facilitate bowing of the beam 16 between such ends. However, in the preferred embodiment of the invention as illustrated in the drawings, the longitudinal torsion axes of the torsion members 12 are at the ends of the neutral axis of the beam 16. There is no change in the length of the member 10 along this axis when the beam bows. Therefore, in response to the measured load, the member 10 exerts only torsional forces on the torsion members 12 in addition to the direct upward or downward thrust of the load.

More specifically, the beam member 10 includes vertical posts 20 integral with and at the ends of the beam 16. The beam 16 thus is a bridge portion extending between the posts 20. The torsion members 12 are secured to the outer surfaces of the posts 20 by means of clamps 22 secured with screws 24. At their ends the torsion members are fastened to supports 26 by means of screws 28 and clamps 30. The supports 26 in turn are fixed to the base 14.

Still referring to FIGS. 1 and 3, the load receiving stud 15 is affixed to a rigid loading plate 34 connected to the beam member 10 by additional torsion members 35. The torsion members 35 are arranged to twist upon application of the load to allow the member 10 to bend relative to the loading plate 34. Specifically, the torsion members 35 are clamped at their mid-points to the inner faces of the posts 20 by clamps 38 threaded onto screws 36 passing through bores provided in the respective posts.

Figure 2:
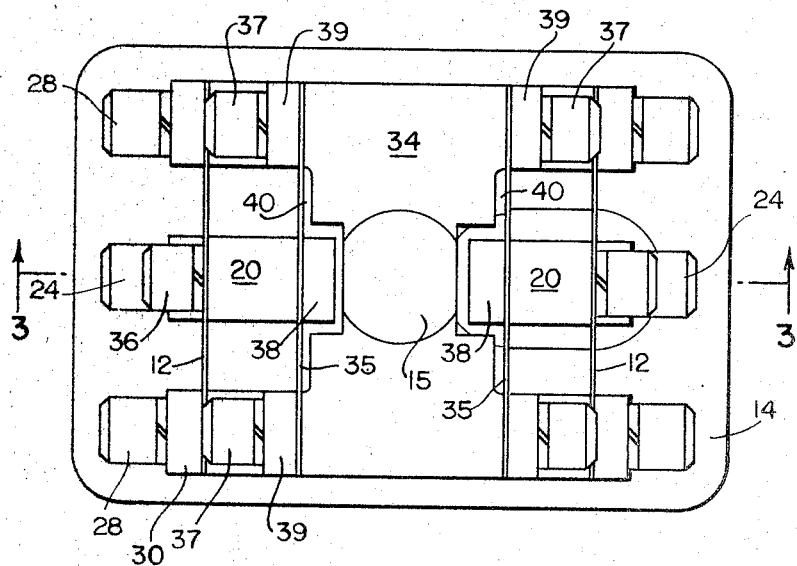
FIGURE 2 is a top view of the load cell of FIGURE 1.

The torsion members 35 and loading plate 34 are best seen in plan view in FIG. 2. The loading plate 34 is substantially rectangular. Each torsion member 35 is clamped at its ends to corners of the loading plate by screws 37 and clamps 39. Loading plate 34 is cut away, as seen at 40, between the ends of the torsion members 35 to allow lateral movement of the torsion members relative to the loading plate and to accommodate the clamps 38 clamping the torsion members to the posts 20.

The strain gages 18 are connected by conductors 41 to a suitable electrical readout device (not shown) calibrated to give a direct reading of the magnitude of the applied load.

When the downwardly directed load L is applied to the stud 15, the load is transmitted through the torsion members 35 to the inner vertical faces of the posts 20, thereby applying a downwardly directed vertical thrust (arrows 43 of FIG. 1) along these inner faces. The downward force thus exerted on the posts 20 is countered by an upward reaction force exerted by the torsion member 12. This upward force is applied along the outer surfaces of the posts as indicated by the arrows 44. The two forces on each post 20 are a couple tending to rotate the post inwardly. That is, there is a clockwise torque on the left-hand post and a counter clockwise torque on the right-hand post, as indicated by the arrows 45 and 47. The combined torque, in turn, bows the beam 16 downwardly and this distortion of the beam is sensed by the gages 18.

If the direction of the applied force L is opposite to that shown, i.e. upward, the load cell will operate in the same manner, except that the various forces and torques will be reversed, with a resultant upward bowing of the beam 16.

The rotation of the posts 20 and bowing beam 16 results in a slight twisting of the torsion members 12 and 35. The torsion members 35 are also pulled inwardly by a small amount when the beam 16 bows downwardly, and they are pushed outwardly when the beam bows upwardly.

The torsion members 12 and 35 are preferably in the form of thin metallic tapes. The tapes are arranged on edge as shown, and they may readily yield for torsional rotation at their midpoints upon application of the load to allow the unhindered bowing of the beam 16. That is, the tapes offer little resistance to the small deflections thereof required for measurement of the load L and the load cell is therefore sensitive to even very slight loads. Beyond these small deflections, however, the tapes exert very large forces resisting distortion of the system. Thus, they effectively resist side forces (left or right in FIG. 2) and prevent any significant lateral shifting of the beam member 10 and load receiving plate 34 relative to the base 14. This will be readily understood by comparing the tapes with a taut wire. The middle of the wire is very easily deflected a small amount, but the wire strongly resists further deflection. This is of particular importance in the case of the torsion members 35 which, not being on the neutral axis of the beam 16, must bend inwardly or outwardly to a slight degree in order to accommodate bowing of the beam. Obviously the tapes also prevent the lateral movement of the suspended parts in the "up-down" direction in FIG. 2.

The tapes are capable of very substantial shear forces and thus they restrain vertical movement of the suspended parts in response to the applied force L. This contributes to the relatively small vertical deflection of the stud 15 under the applied load.

Another factor contributing to the small deflection is the application of the load to the beam member 10 at points which do not coincide with the point of maximum deflection of the beam 16. The point of maximum deflection is midway between the posts 20, whereas the force is applied to the beam member at the outer ends of the beam 16 where the deflection is much less.

As a result the load cell requires relatively small deflection of the stud 15 by the load imposed thereon for a given force rating. That is, the small deflection is achieved while at the same time maintaining a high sensitivity to the applied load.

Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A load cell comprising, in combination:
    (A) a beam member having
        (a) a horizontally extending beam, and
        (b) vertically extending posts at opposite ends of said beam;
    (B) a base structure;
    (C) an elongated horizontal torsion member associated with each post, said torsion members
        (a) extending parallel to each other, and
        (b) substantially normal to the lengthwise axis of said beam, and
        (c) each torsion member being
            (1) anchored at least at a first point thereon to said base structure, and
            (2) rigidly connected at least at one other point thereon spaced therealong from said first point to one of said posts, whereby said torsion members support said beam member on said base structure, and
            (3) relatively weak in the bending mode corresponding to movement of the post attached thereto toward the other post,
    (D) means operative to sense deflection of said beam out of the plane parallel to the longitudinal axes of said beam and said torsion members, whereby upon application of a load to said beam in a direction substantially normal to said plane, said torsion members twist between said points and bow inwardly to allow deflection of said beam out of said plane and this deflection is sensed to produce a load signal.

2. The combination defined in claim 1 in which said torsion members are tapes whose faces are substantially perpendicular to the longitudinal axis of said beam.

3. A load cell comprising, in combination:
    (A) a horizontally extending beam;
    (B) a base structure;
    (C) a first elongated horizontal torsion member associated with each end of said beam, said first torsion members
        (a) extending parallel to each other, and
        (b) substantially normal to the lengthwise axis of said beam, and
        (c) each being
            (1) anchored at least at one point thereon to said base structure, and
            (2) rigidly connected at least at another point thereon spaced from said first point to a vertical face of said beam, said beam faces being spaced apart along said beam axis,
    (D) means operative to sense deflection of said beam out of a plane parallel to the longitudinal axis of said beam and said torsion members, whereby upon application of a load to said beam between said faces in a direction substantially normal to said plane, said torsion members twist between said points and bow inwardly to allow deflection of said beam out of said plane and this deflection is sensed to produce a load signal.

4. The combination defined in claim 3 in which said torsion members are tapes whose faces are perpendicular to the longitudinal axis of said beam.

5. A load cell comprising, in combination:
    (A) a beam member having
        (a) a horizontally extending beam, and,
        (b) vertically extending posts at opposite ends of said beam;
    (B) a base structure;
    (C) a first elongated horizontal torsion member associated with each of said posts, said first torsion members (a) extending parallel to each other and
(b) substantially normal to the lengthwise axis of said beam, and
(c) each being
(1) anchored at a first point thereon to said base structure, and
(2) rigidly connected at another point thereon spaced therealong from said first point to a vertical face of a respective one of said posts,
(D) means operative to sense deflection of said beam out of the plane of the longitudinal axes of said beam and said torsion members, whereby upon application of a load to said beam member in a direction substantially normal to said plane said torsion members twist between said points to allow deflection of said beam out of said plane and this deflection is sensed to produce a load signal;
(E) a rigid horizontally disposed plate presenting a load receiving surface; and
(F) a second elongated horizontal torsion member associated with each post, said second elongated torsion members
(a) extending parallel to each other, and
(b) to said first torsion members, and
(c) each being
(1) anchored at one point thereon to said loading plate and
(2) rigidly connected to a point thereon spaced therealong from said one point to a vertical face of the respective post opposite the face on that post to which the corresponding first torsion member is connected, whereby said load may be applied to said beam member through said loading plate and said second torsion members allow deflection of said beam relative to said loading plate.

6. A load cell according to claim 5 in which said opposite vertical faces of said posts are the surfaces of said posts facing each other.

7. A load cell comprising, in combination:
(A) a beam member having:
(a) a horizontally extending beam, and
(b) vertically extending posts at each end of said beam;
(B) a base structure
(C) a first elongated horizontal torsion member associated with each of said posts, said first torsion members:
(a) extending parallel to each other and
(b) substantially normal to the lengthwise axis of said beam and
(c) each being
(1) anchored at its opposite ends to said base structure and
(2) rigidly connected at a location thereon between its ends to a vertical face of a respective post;
(D) means operative to sense deflection of said beam out of the plane of the longitudinal axes of said beam and said torsion members, whereby upon application of a load to said beam member in a direction substantially normal to said plane said torsion members twist between said points to allow deflection of said beam out of said plane and this deflection is sensed to produce a load signal;
(E) a rigid horizontally disposed plate presenting a load receiving surface;
(F) a second elongated horizontal torsion member associated with each of said posts, said second elongated torsion members;
(a) extending parallel to each other and
(b) to said first torsion members and
(c) each being
(1) anchored at its opposite ends to spaced faces presented by said loading plate, and
(2) rigidly connected at a location thereon between its ends to a vertical face of the respective post opposite the face on that post to which the corresponding first torsion member is connected, whereby said load may be applied to said beam member through said loading plate and said second torsion members allow deflection of said beam relative to said loading plate.

8. A load cell comprising:
(A) a base structure;
(B) a first pair of thin metal tapes, each supported at its opposite ends by said base structure in a horizontal on edge position parallel to, but spaced horizontally from, the other tape;
(C) a beam member comprising a horizontal beam and a vertical post at each end of said beam,
(1) said beam member being supported by and between said tapes, with each tape fastened intermediate its ends to a vertical face of a respective post;
(D) means operative to sense vertical bowing of said beam, whereby upon application of a vertical load to said beam member said tapes move inwardly and twist to allow the beam to bow vertically, and this bowing is sensed to produce a load signal;
(E) a second pair of thin metal tapes each fastened between its ends, in a horizontal on edge position, to a vertical face of a respective post opposite the face of that post to which the corresponding tape of said first pair is fastened; and
(F) a rigid loading plate supported by and between said second tape pair by securement to the opposite ends of each tape of that pair, whereby said load may be applied to said loading plate and the tapes of said second pair twist and more inwardly to allow bowing of said beam.

9. A load cell according to claim 8, in which said tapes of said second tape pair are fastened to the inner, facing surfaces of said posts, whereby upon application of a load to said loading plate and in the direction of said beam member said beam bows downwardly between said posts.

References Cited by the Examiner
UNITED STATES PATENTS

| | | | |
|---|---|---|---|
| 299,757 | 6/1884 | Du Brul | 177—196 |
| 2,729,973 | 1/1956 | Strimel | 73—141 |
| 2,858,126 | 10/1958 | Gomez | 267—1 |
| 2,899,191 | 8/1959 | Hunt | 73—88.5 X |
| 2,906,522 | 9/1959 | Wagner | 267—1 |
| 3,044,308 | 7/1962 | Ensinger | 73—546 |
| 3,221,283 | 11/1965 | Ziggel | 73—88.5 X |

RICHARD C. QUEISSER, *Primary Examiner.*

C. A. RUEHL, *Assistant Examiner.*